United States Patent [19]
Longee, Sr.

[11] 3,762,587
[45] Oct. 2, 1973

[54] BOAT LOADING CARRIER FOR PICKUP MOUNTED CAMPERS

[76] Inventor: Richard W. Longee, Sr., 41 Oak, Apt. 1, Woodland, Calif. 95695

[22] Filed: May 18, 1972

[21] Appl. No.: 254,580

[52] U.S. Cl. .............................................. 214/450
[51] Int. Cl. .............................................. B60r 9/04
[58] Field of Search ................. 214/450, 454, 77 R, 214/1 A; 224/42.1 H; 9/39

[56] References Cited
UNITED STATES PATENTS
| | | | |
|---|---|---|---|
| 2,525,735 | 10/1950 | Symons | 214/77 R |
| 2,763,412 | 9/1956 | Helander | 224/1 H |
| 3,495,729 | 2/1970 | Kruse | 214/450 |
| 3,507,414 | 4/1970 | Souza | 214/450 |
| 3,521,774 | 7/1970 | Raypholtz | 214/450 |

Primary Examiner—Gerald M. Forlenza
Assistant Examiner—Frank E. Werner
Attorney—Robert K. Rhea

[57] ABSTRACT

A cantilever-type boat support frame, overlying a pickup mounted camper, is connected with one end of a pair of support legs pivotally connected to a depending side surface of the camper. Pulley and winch means, connected with the camper, raises and lowers the frame and boat secured thereto. Turnbuckle equipped rod members secure the frame to the other side of the camper when the carrier is in travel position.

6 Claims, 7 Drawing Figures

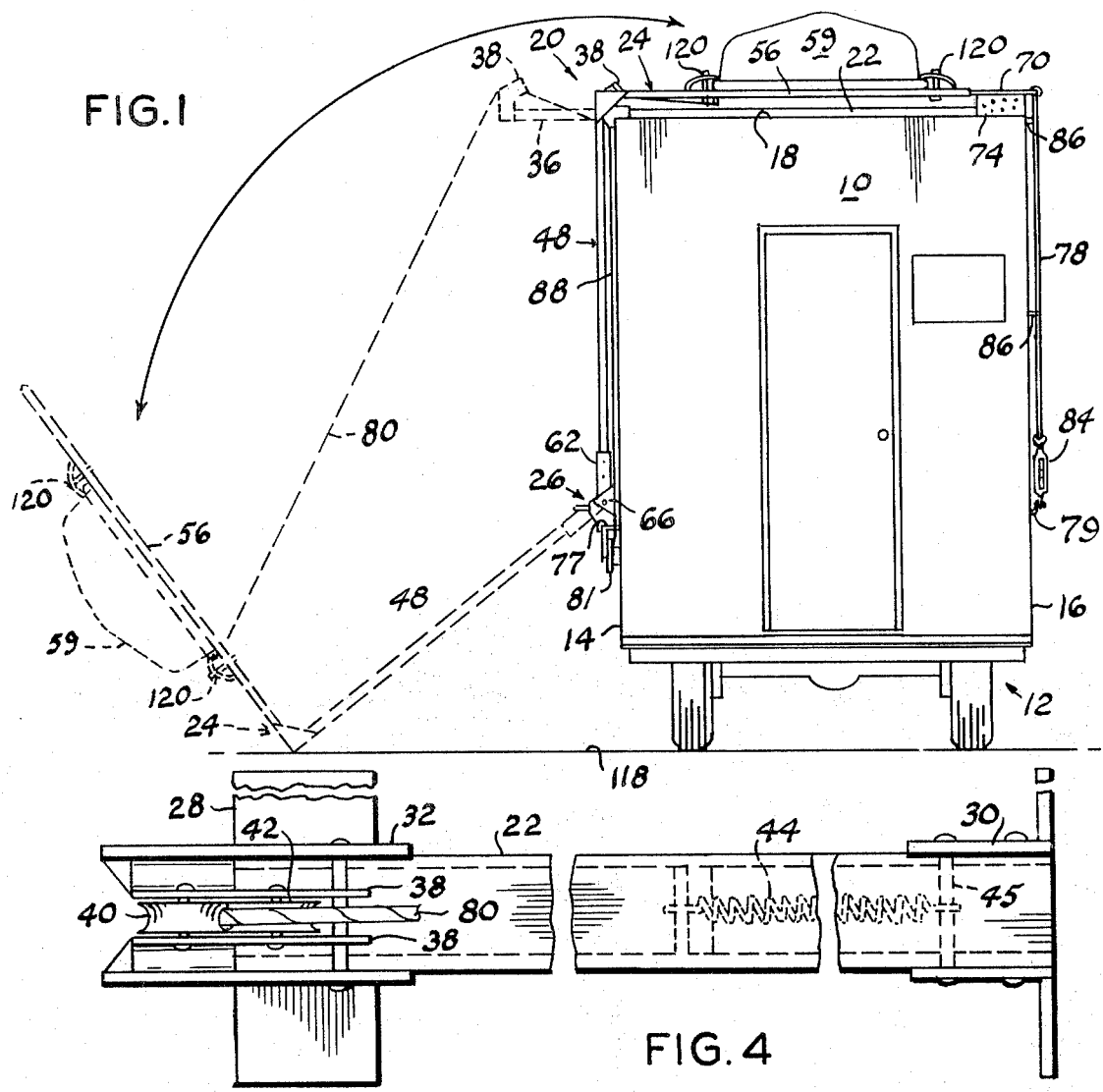
FIG. 1
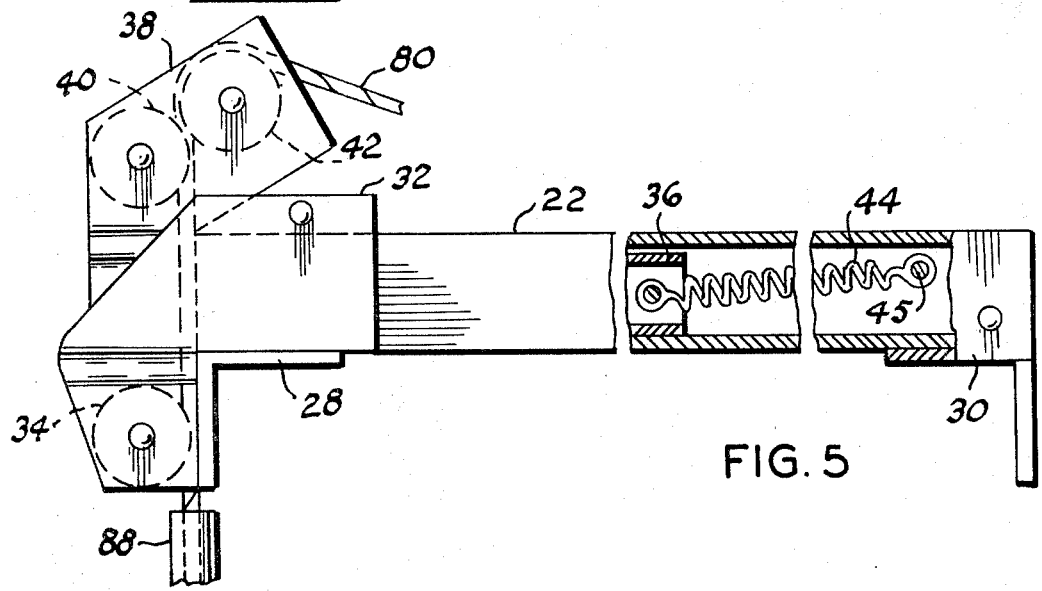
FIG. 4
FIG. 5

PATENTED OCT 2 1973　　3,762,587

BOAT LOADING CARRIER FOR PICKUP MOUNTED CAMPERS

BACKGROUND OF THE INVENTION

1. Field of the Invention

The present invention relates to boat loading and supporting carriers for pickup mounted campers.

2. Description of the Prior Art

Various devices have been developed for lifting boats to the top and off the top of automobiles, however, because of the size of pickup mounted campers these devices are not generally produced for mounting a boat in travel position on the top of a pickup camper.

U.S. Pat. No. 3,357,578 discloses a boat carrier for a pickup mounted camper wherein the support frame, having the boat connected thereto, must be manually lifted or pulled to the top of the camper.

This invention provides a camper side and top mounted frame which is operated by a winch for raising and lowering a boat to or from the top of the camper. Many pickup mounted campers presently in use are provided with an off-set in the plane of its roof, such as being lower at its rearward or forward end portion than the remaining portion of the roof or other configurations of its upper surface, which must be taken into consideration when connecting a boat loading carrier frame to the camper.

This invention overcomes these problems in that it may be easily adjusted to compensate for off-set planes of a camper roof either longitudinally or transversely of the camper. Further, the mass of the frame and boat is easily moved in a raising or lowering action by the novel arrangement of the pulleys, cable and winch means of this invention. This invention also contemplates a rigid connection for the boat supporting portion of the frame on that side of the camper opposite the frame supporting side.

SUMMARY OF THE INVENTION

A cantilever-type boat supporting frame, having a pair of leg supports pivotally connected to one side of the camper, is movable toward and away from the upper surface of the camper by a winch and cable means secured to one side of the camper and a brace bar transversely spanning the camper roof. The boat supporting portion of the frame overlies the camper roof in vertical spaced relation and is supported by spacer blocks mounted on the camper roof and held in contact therewith by a turnbuckle operated rod member secured to the camper side opposite the cable and frame connected side.

The principal object of this invention is to provide an adjustable boat loading and unloading frame operated by pulleys, cable and winch means which may be secured to a pickup mounted camper.

BRIEF DESCRIPTION OF THE DRAWINGS

FIG. 1 is a rearend elevational view of a pickup and camper having a boat loading and carrier frame mounted thereon and illustrating, by dotted lines, the loading and unloading action of the frame;

FIG. 4 is a fragmentary top view of the roof brace and sliding pulley support;

FIG. 5 is an elevational view, partially in section, of FIG. 4;

DESCRIPTION OF THE PREFERRED EMBODIMENTS

Figure 2:
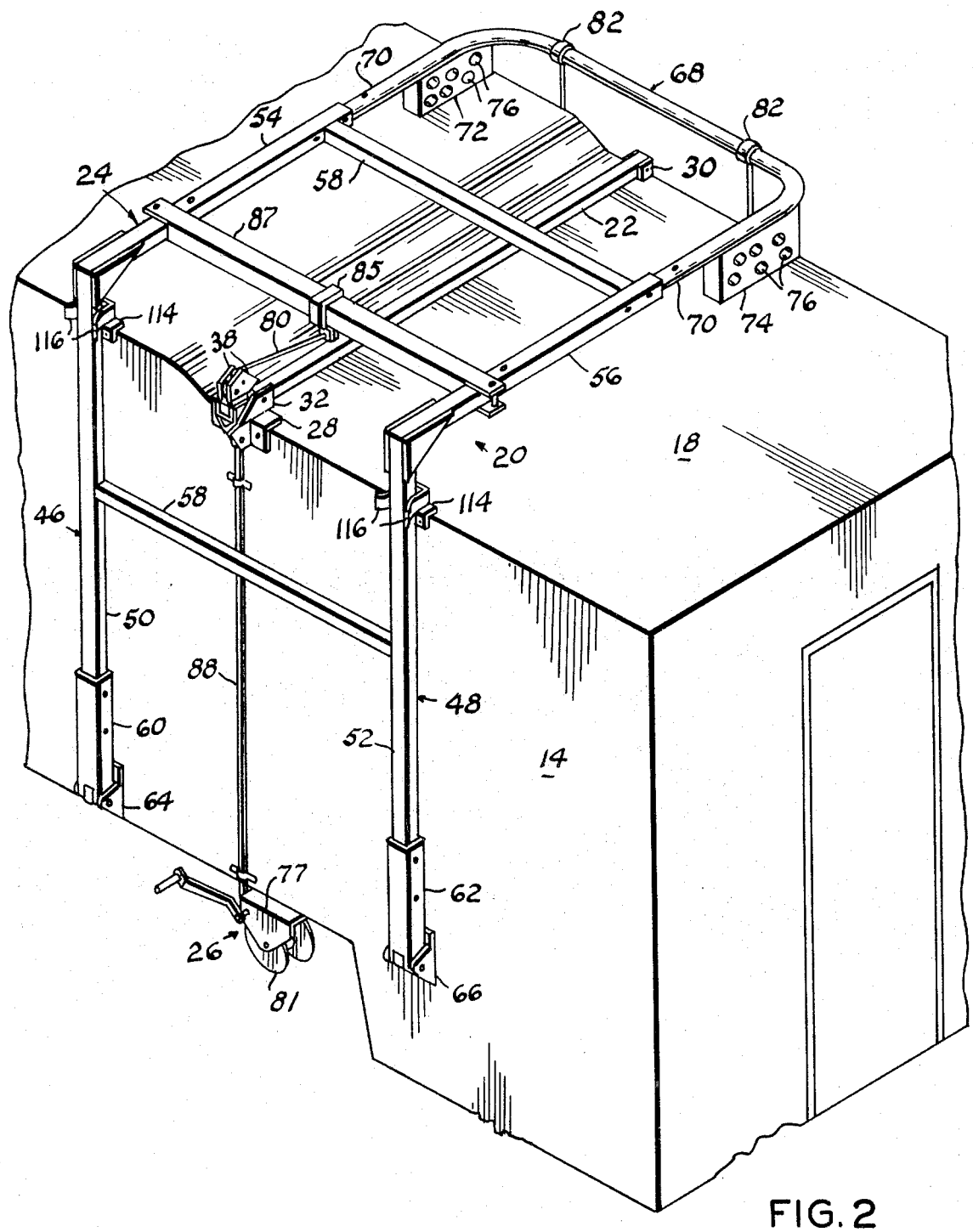
FIG. 2 is a fragmentary isometric view of the camper and boat frame in boat carrying position.

Like characters of reference designate like parts in those figures of the drawings in which they occur.

In the drawings:

Referring more particularly to FIG. 1 and 2, the reference numeral 10 indicates a substantially conventional camper mounted on a pickup truck 12, or the like. The camper 10 is characterized by vertical side walls 14 and 16 interconnected by a top surface or roof 18.

The boat loading and carrying frame, indicated generally at 20, is adapted to be attached to and supported by the camper 10. Basically the frame 20 comprises a stationary support bar 22, pivoting frame 24 and winch means 26 connected with the support 22 and frame 24 for pivoting the frame toward and away from the camper.

Referring also to FIGS. 4 and 5, the support bar 22 comprises an elongated tubular member coextensive with the transverse width of the camper 10 which transversely overlies and is secured to the camper roof 18 at a selected location by brackets 28 and 30 attached to respective ends of the support 22 and upper edge surfaces of the camper. A pair of plates 32 are secured to opposing sides of the support 22 at its end adjacent the camper wall 14. A portion of the plates cooperatively project downwardly from the plane of the roof and journal a pulley 34. An elongated inner tubular member 36 is slidably received in telescoping relation, by the support bar 22 at its end portion adjacent the camper side wall 14. The laterally outward disposed end portion of the inner tube 36 similarly has a pair of plates 38 secured to its opposing sides which project upwardly in parallel spaced relation above the upper limit of the support bar 22 and journal a pair of pulleys 40 and 42 in vertically off-set cooperating aligned relation for the reasons presently explained. The other end of the inner tube 36 has a resilient member, such as a spring 44, connected thereto with the other end of the spring, secured to the end portion of the support bar 22 by a pin 45 adjacent the camper wall 16 for the purposes presently explained.

The frame 24 comprises a pair of inverted substantially L-shaped members 46 and 48 having leg portions 50–52 and tubular foot portions 54–56, respectively, with the legs 50–52 normally disposed vertically adjacent the camper wall 14 and the foot portions horizontally overlying the camper roof 18 in vertical spaced relation. The frame members 46 and 48 are disposed in parallel relation and are transversely interconnected by a plurality of cross braces 58. The spacing between the frame members 46 and 48 is selected in accordance with the dimensions of the camper 10 and the dimensions of a boat 59 to be carried thereby as hereinafter explained.

The depending end portion of the legs 50 and 52 are adjustably received telescopically by a pair of sleeves 60 and 62, respectively, pivotally connected at their depending ends, as viewed in FIGS. 1 and 2, to a pair of brackets 64 and 66 secured to depending edge portions of the camper wall 14. The frame foot portions 54 and 56 are interconnected by a substantially U-shaped frame end member 68 slidably received by its leg end portions 70 within the adjacent end portions of the respective foot portions 54 and 56, thus, forming an extension of the frame foot portions 54 and 56 and permitting the bight portion of the end member 68 to be disposed in the plane of the camper side wall 16 for the purposes presently explained. The frame foot portions 54 and 56 with the end member 68 forms a horizontal boat support platform.

A pair of blocks 72 and 74 are interposed, respectively, between the end member legs 70 and the upper surface of the roof 18 for supporting the end member 68 and foot portions 54 and 56 in a horizontal plane spaced above the roof surface. Thus, it may be seen that the sockets 60 and 62, nesting the frame legs 50 and 52, permits vertical adjustment of the boat support platform to compensate for any variations or off-sets defining the upper limit of the camper roof and, in the example shown, the vertical dimension of the block 72 is less than that of the block 74 as a result of the plane of the rearward portion of the roof 18 being disposed below the plane of its forward portion. A plurality of apertures 76 are formed in each of the blocks to minimize wind resistance while traveling.

The winch means 26 is conventional and may be electric motor driven or hand operated as illustrated. The winch is connected to a depending surface of the camper adjacent its side wall 14 by a bracket 77, selected for the type of winch used, preferably permitting removal of the winch when not in use. The winch includes a cable 80 attached at one end to and wound on its drum 81 and entrained through the pulleys 40 and 42 (FIG. 5) and secured at its other end, to a clamp 85 surrounding a lift bar 87 extending between and adjustably connected to the frame foot portions 54 and 56. Further, the winch 26 is preferably of the type which includes a locking pawl, not shown, for securing the winch drum 81 and permitting reversing direction of rotation of the drum for the reasons presently explained.

The cable 80 preferably extends vertically through an elongated tube 88 clamped, intermediate its ends, to the camper wall 14 to eliminate noise generated by the cable contacting the camper wall in response to wind resistance against the cable while traveling.

Figure 3:
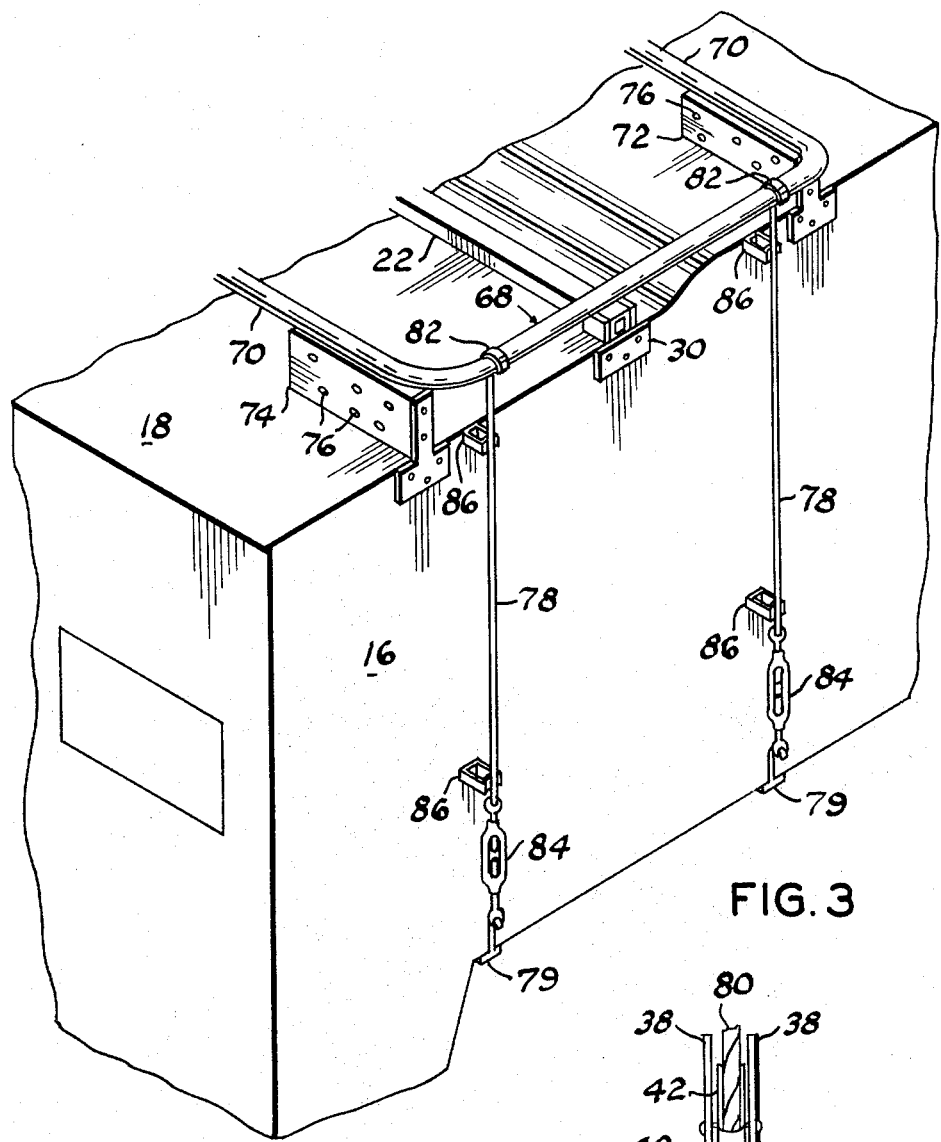
FIG. 3 is a fragmentary isometric view of the manner of connecting the frame to the camper on the opposite side from the position shown in FIG. 2.
Figure 7:
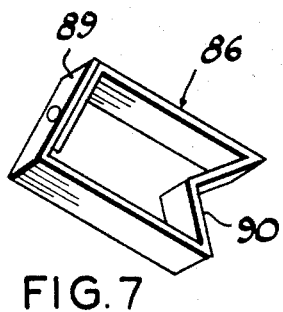
FIG. 7 is an isometric view of a stand-off bracket.
Figure 6:
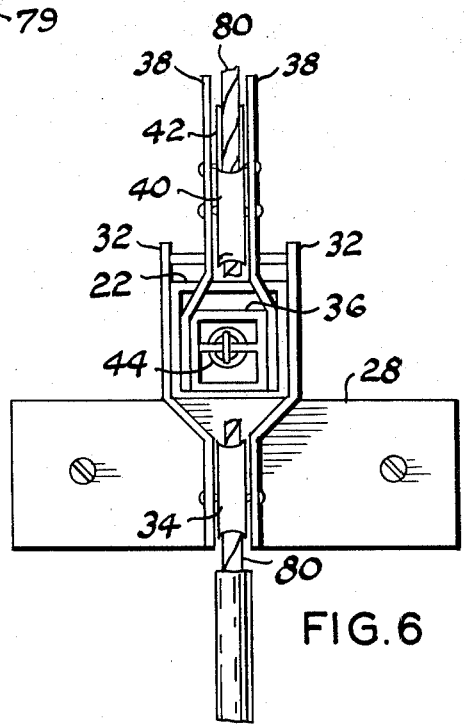
FIG. 6 is a left end elevational view of FIG. 5.

The frame 24 is maintained on the camper in boat carrying and travel position by connecting the end member 68 to the side wall 16 of the camper. This is accomplished by a pair of rod-like anchor members 78 connected in parallel spaced relation to a pair of brackets 79 secured to an overhanging portion of the camper adjacent the side wall 16. The upwardly disposed end of each of the rod-like members 78 is provided with an open hook portion 82 for removably surrounding the end member 68 and the depending end of each rod 78 is connected with one end of a turnbuckle 84 having its other end secured to a hook formed on the respective bracket 79. Each of the rods 78 is maintained in parallel spaced relation with respect to the camper side wall 16 by a pair of stand-off or spacer brackets 86 (FIGS. 3 and 7) secured at one end 89 to the surface of the side wall 16 and having a V-shaped recess 90 formed in its other end for nesting a peripheral portion of the respective rod when the turnbuckles 84 are tightened.

The upwardly disposed end portions of the frame legs 50 and 52 are supported, to prevent movement longitudinally of the camper body, by a pair of friction brackets 114 respectively secured to the junction of the camper roof and side wall 14 in aligned relation with the respective leg. Each of the brackets 114 includes a pair of spaced-apart arcuate wings 116 forming a friction socket for gripping forwardly and rearwardly disposed side surfaces of the respective leg when the legs are positioned adjacent the side wall 14.

Many conventional campers in use are formed with arcuate surfaces defining the juncture of its side walls with the roof and for such campers the brackets 28, 30 and 114 are modified to form a cooperating contiguous contact with the particular arcuate surface rather than being formed with right angular surfaces as shown in the drawings. Similarly other types of leg supporting brackets and anchor rod brackets, as well as spacer brackets, may be used as desired to connect the support bar 22 and frame 24 to camper walls and roof surfaces in the position described hereinabove.

OPERATION

Assuming the boat carrier 20 is assembled and positioned on the camper 10, as shown by solid lines in FIG. 2, the anchor rods 78 are disconnected from the end member 68. The winch 26 is operated to wind the cable on the winch drum which pivots the frame 24 about the pivotal connection of its legs 50 and 52 in a lateral direction away from the camper until the center of gravity of the frame 24 is positioned in vertical alignment above the leg supporting brackets 64 and 66. The winch 26 is temporarily locked in this position so that the direction of rotation of the drum 81 may be reversed to release the cable in an unwinding direction off the drum permitting the frame 24 to continue to pivot laterally of the camper toward the surface of the earth, indicated by the line 118. During this movement of the frame 24, the cable being entrained over the pulleys 34 and 40, pulls the inner tube 36 outwardly, toward its dotted line position, as viewed in FIG. 1, from the plane of the camper wall 14 by expansion of the spring 44. The spring 44 thus cushions the force transmitted to the camper by the cable moving the frame. The boat 59 is then manually positioned on the platform portion of the frame with its longitudinal axis extending transversely of the mounting platform and parallel with the longitudinal axis of the camper. The rim or gunwale of the boat is attached to the respective leg portion of the frame forming the mounting platform by bolts and clamps 120. The winch 26 is again operated for winding the cable 80 on the drum 81 and lifting the frame from its dotted line position toward the camper in the direction of the arrow (FIG. 1). When the frame and boat thereon has the center of gravity of its mass vertically positioned above the leg mounting brackets 64 and 66, in a balanced position, the winch 26 is again locked to reverse the direction of the rotation of the drum so that the cable 80 may be released in an unwinding direction wherein the cable is entrained over the pulley 42 to lower the boat mounting platform of the frame to a horizontal position above the roof 18 and in contact with the mounting blocks 72 and 74 while simultaneously an intermediate portion of the frame legs 50 and 52 respectively enter the friction gripping brackets 114. The anchor rods 78 are then connected to the frame end member 68 and the turnbuckles 84 tightened in the manner described hereinabove.

Obviously the invention is susceptible to changes or alterations without defeating its practicability, therefore, I do not wish to be confined to the preferred embodiment shown in the drawings and described herein.

I claim:
1. A boat carrier for a vehicle mounted camper having side walls and a roof, comprising:
   an elongated tubular bar transversely overlying and secured to said roof intermediate its ends;
   an L-shaped frame having a foot portion forming a boat mounting platform transversely spanning said roof above said bar, said frame having leg portions secured to one side wall of said camper for vertical pivoting movement from an upright position adjacent said one side wall to a lowered position extending laterally and downwardly from said one side wall;
   anchor rod means releasably connecting said mounting platform to the other side wall of said camper;
   pulley means supported by the end portion of said bar adjacent said one side wall; and,
   winch means secured to said one side wall, said winch means including a cable entrained over said pulleys and connected with said mounting platform.

2. The boat carrier according to claim 1 in which said rod anchor means includes:
   an anchor bracket secured to a depending portion of said camper side wall opposite said winch means;
   an elongated rod having a hook at one end portion engageable with the foot portion of said frame; and,
   means interposed beween and connected with said rod and said anchor bracket for moving said rod axially toward said anchor bracket.

3. The boat carrier according to claim 2 in which said pulley means includes:
   laterally projecting depending plates secured to opposite sides of said bar; and,
   a first pulley journalled between said depending plates in cooperating aligned relation with respect to the longitudinal axis of said bar.

4. The boat carrier according to claim 3 in which said pulley means further includes:
   an inner tubular member telescopically extending into said bar from its end portion adjacent the legs of said frame;
   a resilient member connecting the inwardly disposed end portion of said inner tubular member to the other end portion of said bar;
   upstanding plates connected with the outwardly directed end portion of said inner tubular member; and,
   a pair of pulleys journalled by said upstanding plates in cooperating aligned relation with respect to the longitudinal axis of said bar.

5. The boat carrier according to claim 4 and further including:
   spacer supports interposed between the foot portion of said frame and the upper surface of said roof.

6. The boat carrier according to claim 5 and further including:
   boat gripping clamp means secured to the foot portion of said frame for mounting a boat thereon with its longitudinal axis parallel with the longitudinal axis of said camper.

* * * * *